(12) United States Patent
Pan et al.

(10) Patent No.: US 9,571,022 B2
(45) Date of Patent: Feb. 14, 2017

(54) ELECTRICAL GENERATOR WITH INTEGRATED HYBRID RECTIFICATION SYSTEM COMPRISING ACTIVE AND PASSIVE RECTIFIERS CONNECTED IN SERIES

(71) Applicant: ABB Technology AG, Zurich (CH)

(72) Inventors: Zhiguo Pan, Cary, NC (US); Darren Dale Tremelling, Cary, NC (US)

(73) Assignee: ABB SCHWEIZ AG, Baden (CH)

( * ) Notice: Subject to any disclaimer, the term of this patent is extended or adjusted under 35 U.S.C. 154(b) by 50 days.

(21) Appl. No.: 14/016,018

(22) Filed: Aug. 30, 2013

(65) Prior Publication Data

US 2015/0061607 A1 Mar. 5, 2015

(51) Int. Cl.
| | | |
|---|---|---|
| *H02P 11/00* | (2006.01) | |
| *H02P 11/04* | (2006.01) | |
| *H02P 9/00* | (2006.01) | |
| *H02K 3/28* | (2006.01) | |
| *H02P 25/22* | (2006.01) | |
| *H02P 27/08* | (2006.01) | |

(Continued)

(52) U.S. Cl.
CPC .............. *H02P 9/008* (2013.01); *H02K 3/28* (2013.01); *H02M 7/10* (2013.01); *H02M 7/25* (2013.01); *H02P 25/22* (2013.01); *H02P 27/08* (2013.01)

(58) Field of Classification Search
CPC ....... H02K 11/0073; H02K 3/28; H02P 9/008; H02P 25/22; H02P 27/08; H02M 7/10; H02M 7/25
See application file for complete search history.

(56) References Cited

U.S. PATENT DOCUMENTS

| | | |
|---|---|---|
| 4,695,776 A | 9/1987 | Dishner et al. |
| 5,781,428 A | 7/1998 | Paice |

(Continued)

FOREIGN PATENT DOCUMENTS

| | | |
|---|---|---|
| EP | 2 096 732 A1 | 9/2009 |
| WO | WO 2015/030922 A1 | 3/2015 |

OTHER PUBLICATIONS le Roux, A.D., et al. "Digital Control of an Integrated Series Active Filter and Passive Rectifier with Voltage Regulation," Proceedings of the Power Conversion Conference, vol. 1, pp. 68-73. IEEE, PCC-Osaka, 2002.*

(Continued)

*Primary Examiner* — Tulsidas C Patel
*Assistant Examiner* — S. Mikailoff
(74) *Attorney, Agent, or Firm* — Jenkins, Wilson, Taylor & Hunt, P.A.

(57) ABSTRACT

An electrical DC generation system is disclosed. According to one aspect, a system for electrical DC generation includes an electrical machine having multiple stator windings and multiple rectifiers for connection to portions of the stator windings. At least one active rectifier and at least one passive rectifier are connected in series to form a DC bus having a positive terminal and a negative terminal, where the positive terminal of the DC bus is connected to a positive output terminal of the electrical machine and where the negative terminal of the DC bus is connected to a negative output terminal of the electrical machine. The at least one active rectifier is used to control a current flowing through the DC bus and/or an output voltage of the electrical machine.

13 Claims, 3 Drawing Sheets

(51) Int. Cl.
*H02M 7/10* (2006.01)
*H02M 7/25* (2006.01)

(56) References Cited

U.S. PATENT DOCUMENTS

| | | | | |
|---|---|---|---|---|
| 6,031,738 | A * | 2/2000 | Lipo | H02M 7/487 363/37 |
| 6,704,213 | B2 * | 3/2004 | Steimer | H02M 1/12 363/61 |
| 6,762,945 | B2 | 7/2004 | Morgen | |
| 6,788,029 | B1 * | 9/2004 | Gabrys | 322/4 |
| 6,850,032 | B1 * | 2/2005 | Peterson | 318/801 |
| 7,006,366 | B2 * | 2/2006 | Panda | H02M 1/4216 363/70 |
| 7,714,583 | B2 * | 5/2010 | Zhu | H02M 7/217 324/318 |
| 7,977,819 | B2 | 7/2011 | Kitanaka | |
| 8,174,138 | B2 * | 5/2012 | Castelli Dezza | H02M 7/25 290/42 |
| 8,212,371 | B2 * | 7/2012 | Maibach | F03D 9/002 290/44 |
| 9,385,645 | B2 | 7/2016 | Pan et al. | |
| 2002/0044460 | A1 * | 4/2002 | Steimer | H02M 1/12 363/16 |
| 2004/0189251 | A1 * | 9/2004 | Kutkut | H02J 7/022 320/128 |
| 2005/0276082 | A1 * | 12/2005 | Panda | H02M 1/4216 363/70 |
| 2005/0286279 | A1 * | 12/2005 | Datta et al. | 363/89 |
| 2008/0103632 | A1 * | 5/2008 | Saban et al. | 700/286 |
| 2008/0273353 | A1 | 11/2008 | Rumpf | |
| 2009/0212568 | A1 * | 8/2009 | Maibach et al. | 290/44 |
| 2009/0273956 | A1 * | 11/2009 | Castelli Dezza | H02M 7/25 363/67 |
| 2009/0302788 | A1 | 12/2009 | Mitsuda et al. | |
| 2010/0133816 | A1 * | 6/2010 | Abolhassani et al. | 290/44 |
| 2010/0142234 | A1 * | 6/2010 | Abolhassani | H02M 7/49 363/41 |
| 2011/0089693 | A1 * | 4/2011 | Nasiri | 290/44 |
| 2011/0199033 | A1 * | 8/2011 | Abolhassani | H02M 7/49 318/438 |
| 2011/0310642 | A1 | 12/2011 | Dai et al. | |
| 2012/0119586 | A1 | 5/2012 | Carralero et al. | |
| 2012/0133419 | A1 * | 5/2012 | Frey et al. | 327/427 |
| 2012/0262954 | A1 * | 10/2012 | Duvnjak | H02M 1/4258 363/21.02 |
| 2012/0280571 | A1 | 11/2012 | Hargis | |
| 2013/0320778 | A1 | 12/2013 | Hopf et al. | |
| 2014/0254205 | A1 * | 9/2014 | Trainer | H02M 3/335 363/17 |
| 2015/0061606 | A1 * | 3/2015 | Pan et al. | 322/7 |
| 2015/0109837 | A1 * | 4/2015 | Pan | H02M 7/06 363/126 |
| 2015/0349655 | A1 * | 12/2015 | Petersen | H02M 5/458 363/35 |

OTHER PUBLICATIONS

Lin et al., "A Generic Digital Model of Multiphase Synchronous Generator for Shipboard Power System," pp. 348-355, ESTS 2007, IEEE (2007).
Final Office Action for U.S. Appl. No. 14/016,021 (Jul. 10, 2015).
Notification of Transmittal of the International Search Report and the Written Opinion of the International Searching Authority, or the Declaration for International Patent Application No. PCT/US2014/037830 (Jun. 9, 2015).
Notification of Transmittal of the International Search Report and the Written Opinion of the International Searching Authority, or the Declaration for International Patent Application No. PCT/US2014/044399 (Feb. 12, 2015).
Non-Final Office Action for U.S. Appl. No. 14/016,021 (Feb. 9, 2015).
Zhang et al., "PMSG based Multi-Generator Architecture for Wind Generation Application," 2011 6th IEEE Conference on Industrial Electronics and Applications (ICIEA), pp. 335-340 (Jun. 21, 2011).
Hansen et al., "Conceptual survey of Generators and Power Electronics for Wind Turbines," Risø-R-1205(EN), Risø National Laboratory, pp. 1-108 (Dec. 2001).
Advisory Action Before the Filing of an Appeal Brief for U.S. Appl. No. 14/016,021 (Oct. 22, 2015).
Notice of Allowance and Fee(s) Due and Applicant-Initiated Interview Summary for U.S. Appl. No. 14/016,021 (Feb. 23, 2016).

* cited by examiner

200 — PROVIDE AN ELECTRICAL MACHINE HAVING MULTIPLE STATOR WINDINGS AND MULTIPLE RECTIFIERS FOR CONNECTION TO PORTIONS OF THE STATOR WINDINGS, WHERE THE MULTIPLE RECTIFIERS INCLUDE AT LEAST ONE ACTIVE RECTIFIER AND AT LEAST ONE PASSIVE RECTIFIER, WHERE AT LEAST ONE ACTIVE RECTIFIER AND AT LEAST ONE PASSIVE RECTIFIER ARE CONNECTED IN SERIES TO FORM A DC BUS HAVING A POSITIVE TERMINAL AND A NEGATIVE TERMINAL, WHERE THE POSITIVE TERMINAL OF THE DC BUS IS CONNECTED TO A POSITIVE OUTPUT TERMINAL OF THE ELECTRICAL MACHINE AND WHERE THE NEGATIVE TERMINAL OF THE DC BUS IS CONNECTED TO A NEGATIVE OUTPUT TERMINAL OF THE ELECTRICAL MACHINE

202 — USE THE AT LEAST ONE ACTIVE RECTIFIER TO CONTROL THE CURRENT FLOWING THROUGH THE DC BUS AND/OR THE OUTPUT VOLTAGE OF THE ELECTRICAL MACHINE

FIG. 2

ELECTRICAL GENERATOR WITH INTEGRATED HYBRID RECTIFICATION SYSTEM COMPRISING ACTIVE AND PASSIVE RECTIFIERS CONNECTED IN SERIES

TECHNICAL FIELD

The subject matter described herein relates to methods and systems for generation of direct current (DC) power, More particularly, the subject matter described herein relates to methods and systems for an integrated electrical generator with hybrid rectifier.

BACKGROUND

Historically, power companies use large generators to provide alternating current (AC) power to the power grid. Traditionally, most generators are 3-phase sinusoidal AC designs for a 3-phase AC fixed frequency power grid. Even for applications where DC power is required, 3-phase AC generator is used, which requires a 3-phase rectifier to convert the AC power to DC power. If a simple passive diode rectifier is used, it introduces significant harmonic currents which cause rotor losses and torque ripples. Also, a simple rectifier does not provide the capability of regulating torque and voltage. Other the other hand, an active rectifier requires pulse width modulation (PWM) switching. Wind-powered generators also use active rectifiers. In a typical wind-powered generator, the generator must adapt to varying wind conditions, which lead to varying rotor speeds. In order to maximize power output under a variety of wind conditions, wind generators perform maximum power point tracking (MPPT) by regulating electromagnetic torque through PWM switching. Active rectifiers are more costly, less efficient, and less reliable than passive or half controlled rectifiers, however. Multiphase winding electric machines allow passive rectifiers to be used without introducing excessive torque ripple and rotor losses to the machine, but at a cost of reduced capability of torque and voltage control. For this reason, the usage of simple rectifiers is normally limited to field-wound synchronous machines and fixed speed operation.

Thus, each approach has disadvantages. Active rectifiers are more costly, less efficient, and less reliable than passive and half controller rectifiers, but provide the capability of regulating torque and voltage.

Accordingly, in light of these disadvantages, there exists a need for methods and systems for an integrated electrical generator with hybrid rectifier.

SUMMARY

According to one aspect, a system for electrical DC generation includes an electrical machine having multiple stator windings and multiple rectifiers for connection to portions of the stator windings. At least one active rectifier and at least one passive rectifier are connected in series to form a DC bus having a positive terminal and a negative terminal, where the positive terminal of the DC bus is connected to a positive output terminal of the electrical machine and where the negative terminal of the DC bus is connected to a negative output terminal of the electrical machine. The at least one active rectifier is used to control a current flowing through the DC bus and/or an output voltage of the electrical machine.

According to another aspect, the subject matter described herein includes a method for electrical DC generation. The method includes providing an electrical machine having multiple stator windings and multiple rectifiers for connection to portions of the stator windings, where the plurality of rectifiers includes at least one passive rectifier and at least one active rectifier. At least one active rectifier and at least one passive rectifier are connected in series to form a DC bus having a positive terminal and a negative terminal, where the positive terminal of the DC bus is connected to a positive output terminal of the electrical machine and where the negative terminal of the DC bus is connected to a negative output terminal of the electrical machine. The method includes using the at least one active rectifier to control a current flowing through the DC bus and/or an output voltage of the electrical machine.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which:

FIG. 2 is a Flow chart illustrating an exemplary process for electrical DC generation according to an embodiment of the subject matter described herein.

DETAILED DESCRIPTION

In accordance with the subject matter disclosed herein, methods, systems, and computer readable media for electrical direct current generation are provided. The subject matter disclosed herein includes an integrated hybrid generator/rectifier having both active rectifiers and passive (e.g., diode) rectifiers operating together, and methods for using same. In one embodiment, the active and passive rectifiers are used in a series connection. The methods and systems disclosed herein will have lower cost and higher efficiency compared with conventional generators while maintaining full torque and voltage controllability.

Reference will now be made in detail to exemplary embodiments of the present invention, examples of which are illustrated in the accompanying drawings. Wherever possible, the same reference numbers will be used throughout the drawings to refer to the same or like parts.

Figure 1:
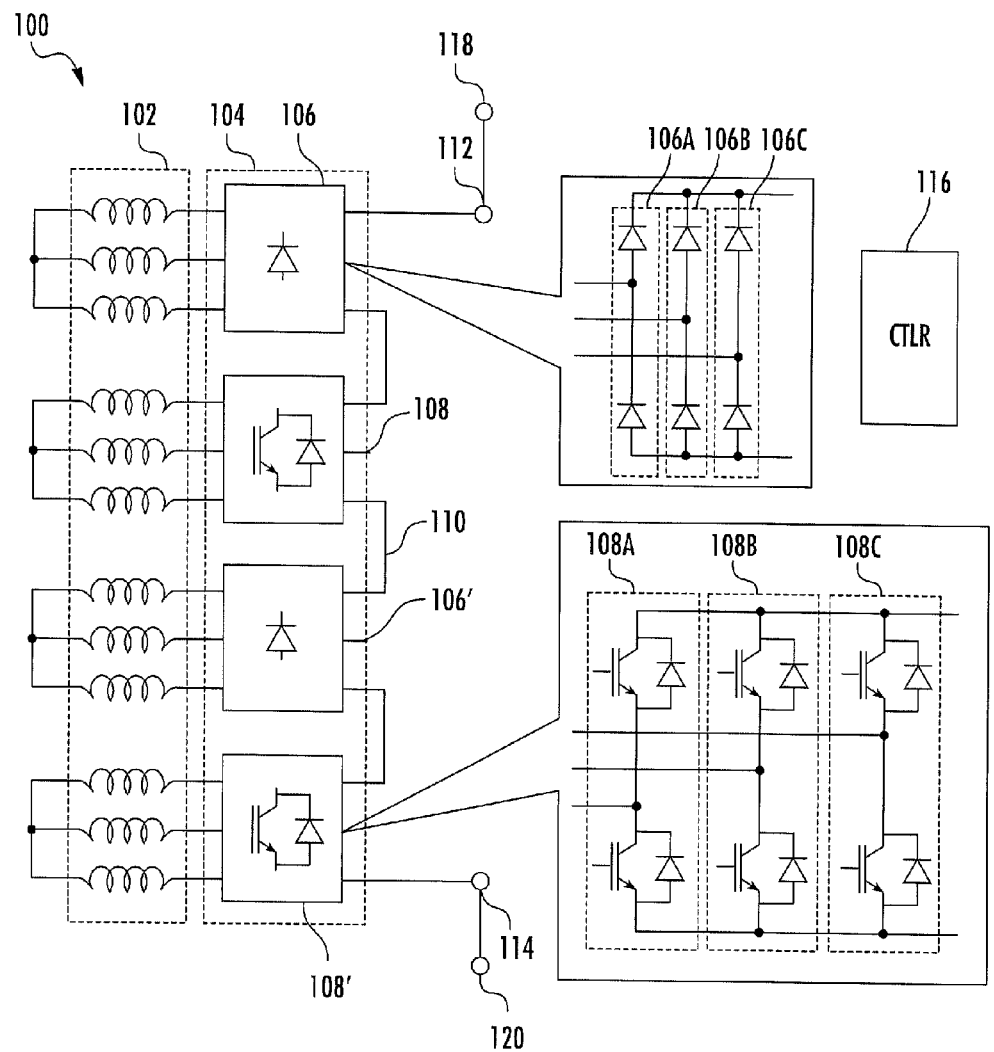
FIG. 1 is a block diagram illustrating an exemplary system for generating electrical direct current according to an embodiment of the subject matter described herein.

FIG. 1 is a block diagram illustrating an exemplary system for generating electrical direct current according to an embodiment of the subject matter described herein. In the embodiment illustrated in FIG. 1, electrical machine 100 includes multiple stator windings 102 and multiple rectifiers 104 for connection to stator windings 102, where rectifiers 104 includes at least one passive rectifier 106 and at least one active rectifier 108. In the embodiment illustrated in FIG. 1, for example, electrical machine 100 includes passive rectifiers 106 and 106' and active rectifiers 108 and 108'.

Stator windings 102 may be grouped into sets, and each set may be connected to its own rectifier. In the embodiment illustrated in FIG. 1, for example, stator windings 102 are grouped into four sets of three windings each, representing an electrical machine having multiple three-phase winding groups. In this configuration, electrical machine 100 may be a 12-phase machine, a 3-phase machine with redundant windings, or another type of machine, for example. The principles described herein are not limited to the configurations disclosed in the figures but also apply to other configurations (i.e., total numbers of windings, numbers of phases, numbers of redundancies, and so on.)

The multiple winding sets may be physically distributed in the stator. The phase difference between the winding sets allows the harmonics in windings connected to passive rectifiers to cancel each other. In the embodiment illustrated in FIG. 1, for example, the winding sets connected to rectifiers 106 and 106' can be arranged so there are 30 degrees of phase difference between them.

In the embodiment illustrated in FIG. 1, passive rectifier 106 includes three sets of diode pairs 106A, 106B, and 106C, one set for each coil in the 3-phase winding set. Passive rectifiers 106 may include other passive devices, and may include half-controlled devices, such as thyristors.

In the embodiment illustrated in FIG. 1, active rectifier 108 includes three sets of pairs of active devices 108A, 108B, and 108C, one set for each coil in the 3-phase winding set. Examples of active devices include, but are not limited to, an insulated gate bipolar junction transistor (IGBT), an integrated gate commutated thyristor (IGCT), a gate turn-off thyristor (GTO), a metal oxide semiconductor field effect transistor (MOSFET), or other active device. In the embodiment illustrated in FIG. 1, each active device includes an IGBT in parallel with a protection diode.

In one embodiment, at least one passive rectifier and at least one active rectifier are connected in series to form a DC bus 110 having a positive terminal 112 and a negative terminal 114. The positive terminal 112 is connected to a positive output terminal 118 of the electrical machine 100, and the negative terminal 114 is connected to a negative output terminal 120 of the electrical machine 100. In the embodiment illustrated in FIG. 1, DC bus 110 connects positive terminal 112 to negative terminal 114 through a first passive rectifier 106, a first active rectifier 108, a second passive rectifier 106', and a second active rectifier 108'. In this manner, rectifiers 104 are electrically connected in series but are not magnetically connected.

Figure 3:
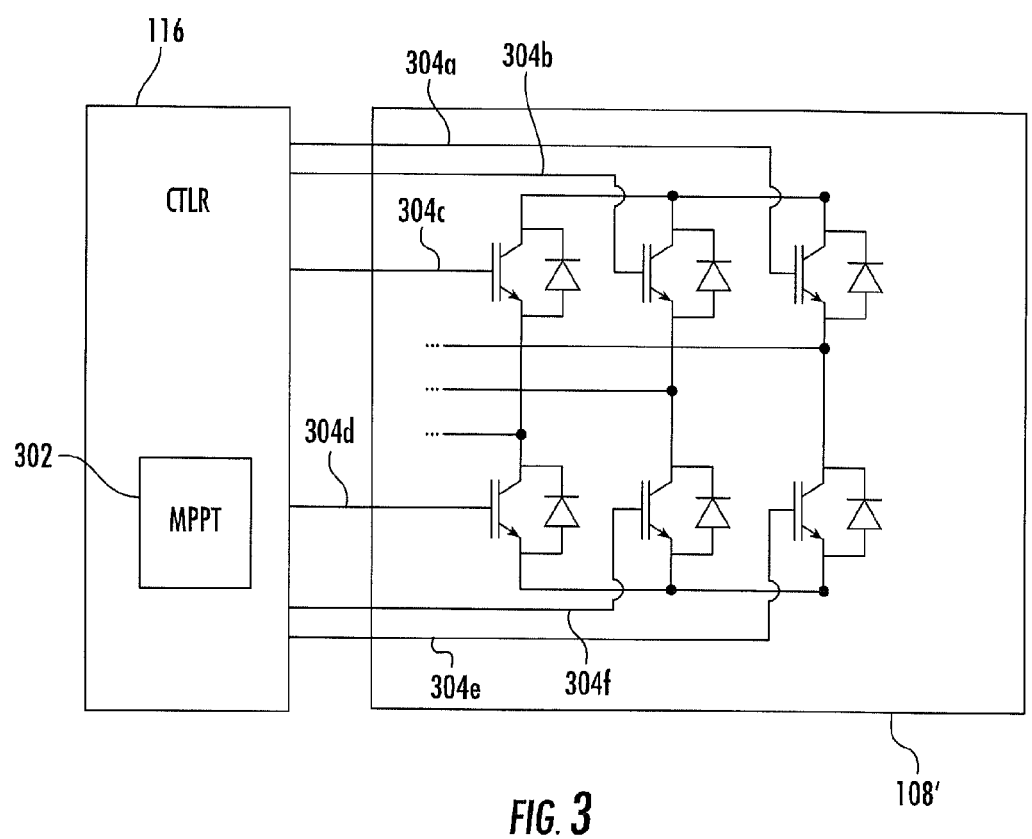
FIG. 3 is a block diagram illustrating a portion of the exemplary system illustrated in FIG. 1.

Although omitted from FIG. 1 for clarity, each active rectifier 108 receives one or more control signals for controlling the active devices within. Connections 304a-f carrying the control signals are illustrated in FIG. 3. In one embodiment, these control signals may be provided by a hardware controller or control circuit 116. Electrical machine 100 can use these control signals to control current flowing through the DC bus and/or the output voltage of the electrical machine. In this manner, the torque of electrical machine 100 may be regulated, e.g., to provide maximum power output for a given rotor speed. In one embodiment, the torque of electrical machine 100 may be regulated to provide according to a maximum power point tracking (MPPT) algorithm 302.

The hybrid rectifier configuration illustrated in FIG. 1 is suitable for a variety of types of electrical machines, including, but not limited to, machines with single phase windings, three phase windings, multiphase windings (i.e., more than three phases), windings having integer slots per pole per phase, and windings having fractional slots per pole per phase. Examples of electrical machine 100 include, but are not limited to, a field wound synchronous electrical machine, a permanent magnet electrical machine, a self-excited squirrel cage induction electrical machine, and a doubly-fed induction machine. In one embodiment, DC bus 110 may include different parallel branches. In one embodiment, rectifiers 104 may be integrated into the machine housing to reduce size, weight, and/or footprint, as well as to simplify connection.

The combination of active and passive rectifiers has distinct advantages over conventional electrical machines that use just one type or the other type. One advantage is that the combination of active and passive rectifiers provides a balance between controllability and cost, by providing the controllability of active rectification with the reduced cost of passive rectification. In addition, by separating active rectifiers 108 and 108' from each other by including passive rectifiers 106 and 106' between them, each active rectifier is protected from the switching transients of the other active rectifier, which might otherwise compromise the control capability of the active rectifiers. Other advantages include high machine and converter efficiency, lower machine rotor losses, a lower cost machine having a higher performance rectifier system, smaller size, weight, or footprint, and reduced voltage stresses on stator windings.

In one embodiment, electrical machine 100 may include multi-level converters with a higher number of levels, so that reduced energy storage may be needed for multi-level inverters tied to the rectifiers. In one embodiment, the number and manner of connections of the series connected rectifiers may be optimized based on voltage level, machine size, machine pole number and device ratings, and so on. In one embodiment, electrical machine 100 may include circuitry to reconfigure the topology of the rectifier connections.

In one embodiment, the configuration of rectifier units, including the number of units needed, the type of units needed, and the connection topology between the units, may be adjusted statically or dynamically, e.g., according to operating conditions of electrical machine 100. For example, electrical machine 100 may be configurable to operate using only active rectifiers 108, only passive rectifiers 106, or a combination of active and passive rectifiers, such as shown in FIG. 1. In this manner, a reconfigurable electrical machine 100 could be configured to operate in the configuration that best suits a particular condition or operating environment. In one embodiment controller 116 may automatically perform reconfiguration as needed in response to detected changes in operating conditions, receipt of configuration instructions from a person, and so on.

In one embodiment, controller 116 may provide additional functions, including but not limited to detecting fault conditions and responding to those conditions, which may include making adjustments to the control signals to the active rectifiers, changing the operating conditions of electrical machine 100, and reconfiguring electrical machine 100 as described above.

FIG. 2 is a flow chart illustrating an exemplary process for electrical DC generation according to an embodiment of the subject matter described herein. In the embodiment illustrated in FIG. 2, step 200 of the method includes providing an electrical machine having multiple stator windings and multiple rectifiers for connection to portions of the stator windings, where the multiple rectifiers include at least one passive rectifier and at least one active rectifier. At least one active rectifier and at least one passive rectifier are connected in series to form a DC bus having a positive terminal and a negative terminal, where the positive terminal of the DC bus is connected to a positive output terminal of the electrical machine and where the negative terminal of the DC bus is connected to a negative output terminal of the electrical machine. For example, an electrical machine such as electrical machine 100 in FIG. 1 may be provided.

Step 202 includes using the at least one active rectifier to control a current flowing through the DC bus and/or an output voltage of the electrical machine. For example, active rectifiers 108 and 108' of machine 100 may be used to control the current flowing through DC bus 110 and/or the output voltage present across positive terminal 112 and negative terminal 114.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for electrical direct current (DC) generation, the system comprising:
    a control circuit, and
    an electrical machine, the electrical machine having:
        a positive output terminal;
        a negative output terminal;
        a plurality of three-phase stator winding sets, each set comprising three single-phase coils; and
        a plurality of rectifiers, each rectifier connected to a respective set of the plurality of stator winding sets, wherein the plurality of rectifiers includes at least one passive rectifier and at least first and second active rectifiers;
    wherein the first and second active rectifiers and the at least one passive rectifier are connected in series with the passive rectifier between the first and second active rectifiers to form a DC bus;
    the DC bus having a positive terminal and a negative terminal;
    wherein the positive terminal of the DC bus is connected to the positive output terminal of the electrical machine,
    wherein the negative terminal of the DC bus is connected to the negative output terminal of the electrical machine;
    wherein the first and second active rectifiers each comprise a set of insulated gate bipolar transistors, each transistor in parallel with a protection diode,
    wherein the passive rectifier between the first and second active rectifiers comprises three sets of diode pairs, with each set of diode pairs connected to a respective single-phase coil of the respective three-phase stator winding set to which the passive rectifier is connected;
    wherein the first and second active rectifiers are regulated by the control circuit via control signals to control at least one of a current flowing through the DC bus and an output voltage of the electrical machine; and
    wherein the control circuit is configured to respond to detected fault conditions by making adjustments to the control signals supplied to the first and second active rectifiers.

2. The system of claim 1 wherein the control circuit is further configured to regulate torque of the electrical machine by adjusting a control signal supplied to at least one of the first and second active rectifiers.

3. The system of claim 2 wherein the control circuit is configured to regulate the torque of the electrical machine to provide power output based on a rotor speed.

4. The system of claim 3 wherein the control circuit is configured to regulate the torque of the electrical machine according to a maximum power point tracking (MPPT) algorithm.

5. The system of claim 1 wherein the stator winding sets are configured so that, in operation, the electrical machine produces a phase difference between the stator winding sets.

6. The system of claim 1 wherein at least one of the plurality of stator winding sets comprises one of:
    a winding set having integer slots per pole per phase; and
    a winding set having fractional slots per pole per phase.

7. The system of claim 1 wherein the electrical machine comprises one of:
    a field wound synchronous electrical machine;
    a permanent magnet electrical machine;
    a self-excited squirrel cage induction electrical machine; and
    a doubly-fed induction electrical machine.

8. A method for generation of electrical direct current (DC), the method comprising:
    providing a control circuit and an electrical machine, the electrical machine having:
        a positive output terminal and a negative output terminal;
        a plurality of three-phase stator winding sets, each set comprising three single-phase coils;
        a plurality of rectifiers, each rectifier connected to a respective set of the plurality of stator winding sets;
    wherein the plurality of rectifiers includes at least one passive rectifier and at least first and second active rectifiers;
    wherein the first and second active rectifiers and the at least one passive rectifier are connected in series with the passive rectifier between the first and second active rectifiers to form a DC bus having a positive terminal and a negative terminal, wherein the positive terminal of the DC bus is connected to the positive output terminal of the electrical machine and wherein the negative terminal of the DC bus is connected to the negative output terminal of the electrical machine; and
    wherein the first and second active rectifiers each comprise a set of insulated gate bipolar transistors, each transistor in parallel with a protection diode, wherein the passive rectifier between the first and second active rectifiers comprises three sets of diode pairs, with each set of diode pairs connected to a respective single-phase coil of the respective three-phase stator winding set to which the passive rectifier is connected;

the method further comprising regulating, using the control circuit, the first and second active rectifiers to control at least one of a current flowing through the DC bus and an output voltage of the electrical machine; and responding, using the control circuit, to detected fault conditions by making adjustments to control signals supplied to the first and second active rectifiers.

9. The method of claim 8 comprising using at least one of the first and second active rectifiers to regulate torque of the electrical machine.

10. The method of claim 9 wherein regulating torque of the electrical machine comprises regulating torque to provide power output based on a rotor speed.

11. The method of claim 10 wherein regulating torque of the electrical machine comprises using a maximum power point tracking (MPPT) algorithm.

12. The method of claim 8 wherein at least one of the plurality of stator winding sets comprises one of:
   a winding set having integer slots per pole per phase; and
   a winding set having fractional slots per pole per phase.

13. The method of claim 8 wherein the electrical machine comprises one of:
   a field wound synchronous electrical machine;
   a permanent magnet electrical machine;
   a self-excited squirrel cage induction electrical machine; and
   a doubly-fed induction machine.

* * * * *